US006382676B1

(12) United States Patent
Cochran et al.

(10) Patent No.: US 6,382,676 B1
(45) Date of Patent: May 7, 2002

(54) HANG TAB WITH DETACHABLE COUPON PORTION

(75) Inventors: William H. Cochran, Bangor; Andrew G. Hughey, Grand Junction, both of MI (US)

(73) Assignee: Do-it Corporation, South Haven, MI (US)

( * ) Notice: Subject to any disclaimer, the term of this patent is extended or adjusted under 35 U.S.C. 154(b) by 0 days.

(21) Appl. No.: 09/732,798

(22) Filed: Dec. 8, 2000

(51) Int. Cl.[7] ................................................ G09B 19/00

(52) U.S. Cl. ........................ 283/51; 40/299.01; 40/630; 206/460; 229/70; 283/79; 283/101

(58) Field of Search ................................ 206/447, 449, 206/460, 486, 775; 283/51, 79, 81, 98, 101, 105; 229/70, 71; 40/299.01, 312, 360, 630, 638

(56) References Cited

U.S. PATENT DOCUMENTS

| | | | | | |
|---|---|---|---|---|---|
| 3,994,089 | A | * | 11/1976 | Schwartz | 40/310 |
| 4,019,632 | A | * | 4/1977 | Greenlee | 206/349 |
| 4,832,301 | A | | 5/1989 | Hiramoto et al. | |
| 5,020,761 | A | | 6/1991 | Good et al. | |
| 5,161,687 | A | * | 11/1992 | Kornell et al. | 206/447 |
| 5,240,174 | A | * | 8/1993 | Wenninger | 229/117.15 |
| 5,303,819 | A | * | 4/1994 | Goldberg | 206/83 |
| 5,343,647 | A | * | 9/1994 | Bulka | 283/101 |
| 5,381,202 | A | * | 1/1995 | Mizuno et al. | 354/275 |
| 5,474,183 | A | * | 12/1995 | Warren et al. | 206/459.5 |
| 5,542,634 | A | | 8/1996 | Pomerantz | |
| 5,728,440 | A | * | 3/1998 | Good | 428/40.1 |
| 5,868,498 | A | * | 2/1999 | Martin | 383/11 |
| 5,893,459 | A | * | 4/1999 | Croft | 206/460 |
| 6,299,530 | B1 | * | 10/2001 | Hansted et al. | 206/449 |
| 6,305,329 | B1 | * | 10/2001 | Levy, Jr. | 119/858 |

FOREIGN PATENT DOCUMENTS

| | | | |
|---|---|---|---|
| GB | 2237676 | * | 5/1991 |

* cited by examiner

*Primary Examiner*—Willmon Fridie, Jr.
*Assistant Examiner*—Monica Canter
(74) *Attorney, Agent, or Firm*—Flynn, Thiel, Boutell & Tanis, P.C.

(57) ABSTRACT

A hang tab that is used to suspend an article and display a removable coupon is provided in the form of a uniformly thin flat sheet of synthetic resin material having a coupon section integrally formed with the flat sheet with tearable perforated portions and cut portions around the perimeter of the coupon portion. The coupon portion is easily removable from the hang tab. A separate bonding section having an adhesive layer is provided adjacent the coupon portion and a hole for hanging is provided remote from the bonding section. The adhesive layer adheres to the product to be suspended using the hole. A consumer may remove the coupon from the coupon portion after purchase of the product.

14 Claims, 4 Drawing Sheets

HANG TAB WITH DETACHABLE COUPON PORTION

FIELD OF THE INVENTION

This invention relates to a hang tab made of a uniformly thin flat sheet of synthetic resin material for facilitating display of products on a support structure, such as a peg or a hook, and having a detachable coupon portion within the boundary of the hang tab.

BACKGROUND OF THE INVENTION

It is known to display products for sale, such as blister packs, video cassettes and the like, by attaching them to flat plastic hangers which have an adhesive portion that bonds the product and a hanging means, such as an aperture by which the hanger and the product are supported by a support structure, such as a peg or a hook. For example U.S. Pat. No. 4,832,301 discloses a hanger for articles such as video tapes. This hanger has a flat sheet with an adhesive section and a folding section separate from the adhesive section in which lies a hole for hanging the article. The folding section unfolds to facilitate hanging of the article and the adhesive adheres to the article to be hung, such as the video tape package. The folding section is separate from the adhesive section because that portion does not adhere to the video tape package when the video tape package is hung on a peg, hook or the like for display.

Although this type of hanger has the advantage of being able to adhere to a cassette box and easily hung for display, one may not remove the folding section or any other portion of the hanger. It is desirable to have removable advertising material printed onto a coupon section that a consumer may remove after buying the product to use for a future purchase or for an in-store redemption at the time of the purchase.

Accordingly, it is an object of this invention to provide a hang tab having a removable portion, such as a coupon section, that may be manually removed by a consumer for a future purchase or in-store redemption program at the time of the purchase. Such a feature is highly advantageous because promotional items, such as a coupon, are easily displayed in association with the product supported by the hang tab. Thus, coupons in this form are efficiently distributed and eliminate the need for a separate coupon (along with the attendant printing, application, and material usage) as is presently done.

Another advantage is that the hang tabs along with the coupons may be neatly packaged into a box with or without the article to be sold. As discussed earlier, the hang tabs and the coupons are shipped together and once they are paired with the article, efficient distribution of the coupons with each product purchased may be achieved.

SUMMARY OF THE INVENTION

The objects and purposes of the invention are met by providing a hang tab having a uniformly thin flat sheet of synthetic resin material, the flat sheet having a coupon portion that is an integral part of the flat sheet and oriented offset from said bonding section. The coupon section and the flat sheet are joined by a perforated joint extending over a first portion of a perimeter of the coupon portion, the remaining second portion of the perimeter being free of connection to the flat sheet. The flat sheet has a hole formed therethrough in a region separate from and adjacent the coupon section.

BRIEF DESCRIPTION OF THE DRAWINGS

Other objects and purposes of this invention will be apparent to persons acquainted with hang tab configurations of this general type upon reading the following specification and inspecting the accompanying drawings, in which.

DETAILED DESCRIPTION

Figure 1:
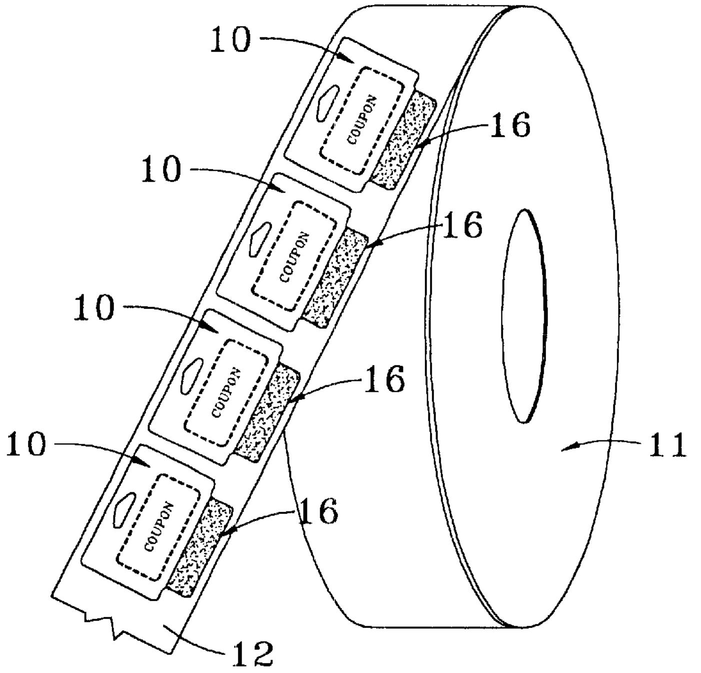
FIG. 1 is an isometric view of a roll of release liner material with hang tabs embodying the invention releasably secured thereon.

Certain terminology will be used in the following description for convenience and reference only and will not be limiting. The words "up", "down", "rightwardly", "leftwardly" will designate directions in the drawings to which reference is made. The words "in" and "out" will refer to directions toward and away from, respectively, the geometric center of the device and designated parts thereof. Such terminology will include derivatives thereof and words of similar import.

Referring to FIG. 1, there is shown plural hang tabs 10 embodying the invention which are adhesively secured to a roll 11 of release liner material 12.

Figure 2:
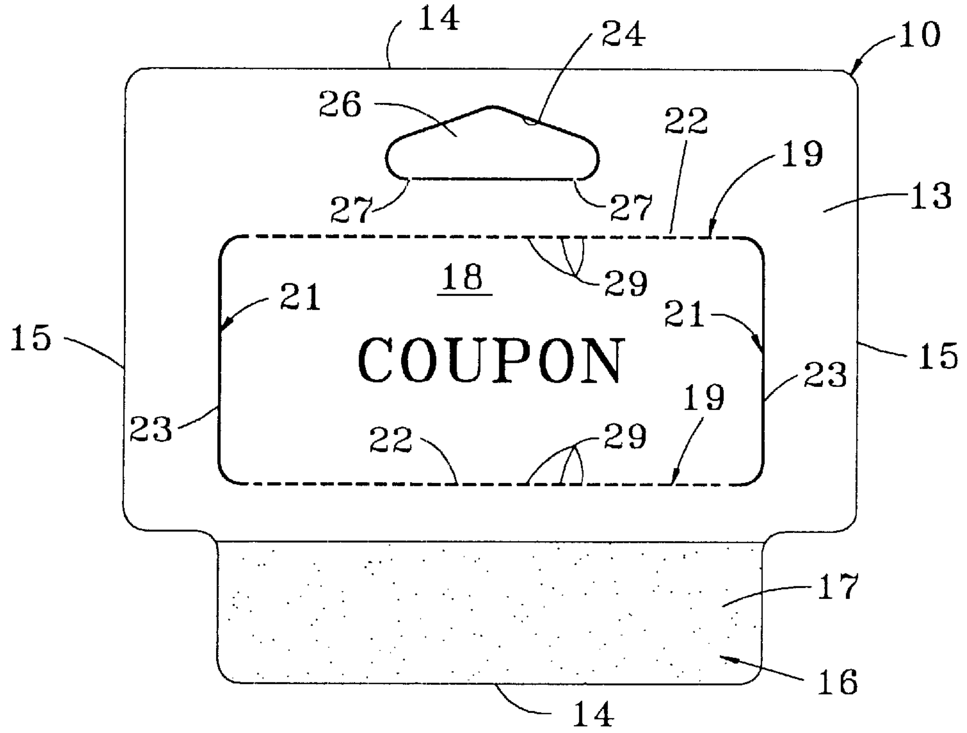
FIG. 2 is a plan view of a hang tab embodying the invention.

FIG. 2 shows one of the hang tabs 10 of FIG. 1 in more detail. The hang tab 10 is made of a uniformly thin flat sheet 13 of synthetic resin material. The flat sheet 13 is of a generally rectangular configuration having a pair of parallel long side edges 14 orthogonally related to a pair of parallel short side edges 15. A bonding section 16 is provided on the flat sheet and has an adhesive layer 17 applied thereto. The adhesive layer 17 may be a commonly available adhesive well known in this art. A rectangular shaped coupon section 18 is formed within the peripheral boundary of the flat sheet 13 as an integral part of the hang tab 10. A pair of tearable perforated joints 19 and a pair of precut portions 21 facilitate easy removal of the coupon section 18 from the flat sheet 13. Advantageously the perforated joints 19 may be provided along long side edges 22 of the coupon section 18, and the precut portions 21 may be provided along the short side edges 23 of the coupon section 18. The long side edges 22 of the coupon section 18 may be parallel to the long side edges 14 of the flat sheet 13, and the short side edges 23 of the coupon section 18 may be parallel with the short side edges 15 of the flat sheet 13.

A hole, shown generally as at 24, is located adjacent to the coupon section 18, preferably between the coupon section 18 and a long edge 14 remote from the bonding section 16. A small hole filler piece 26 is oriented in the hole 24 and integrally secured to the flat sheet 13 at least at one point on the perimeter of the hole 24 by a tearable small width web 27. In the embodiment shown in FIG. 2, two small width webs 27 are depicted. Thus, the small hole filler piece 26 filling the hole 24 is easily removed by severing the web or webs 27.

Figure 3:
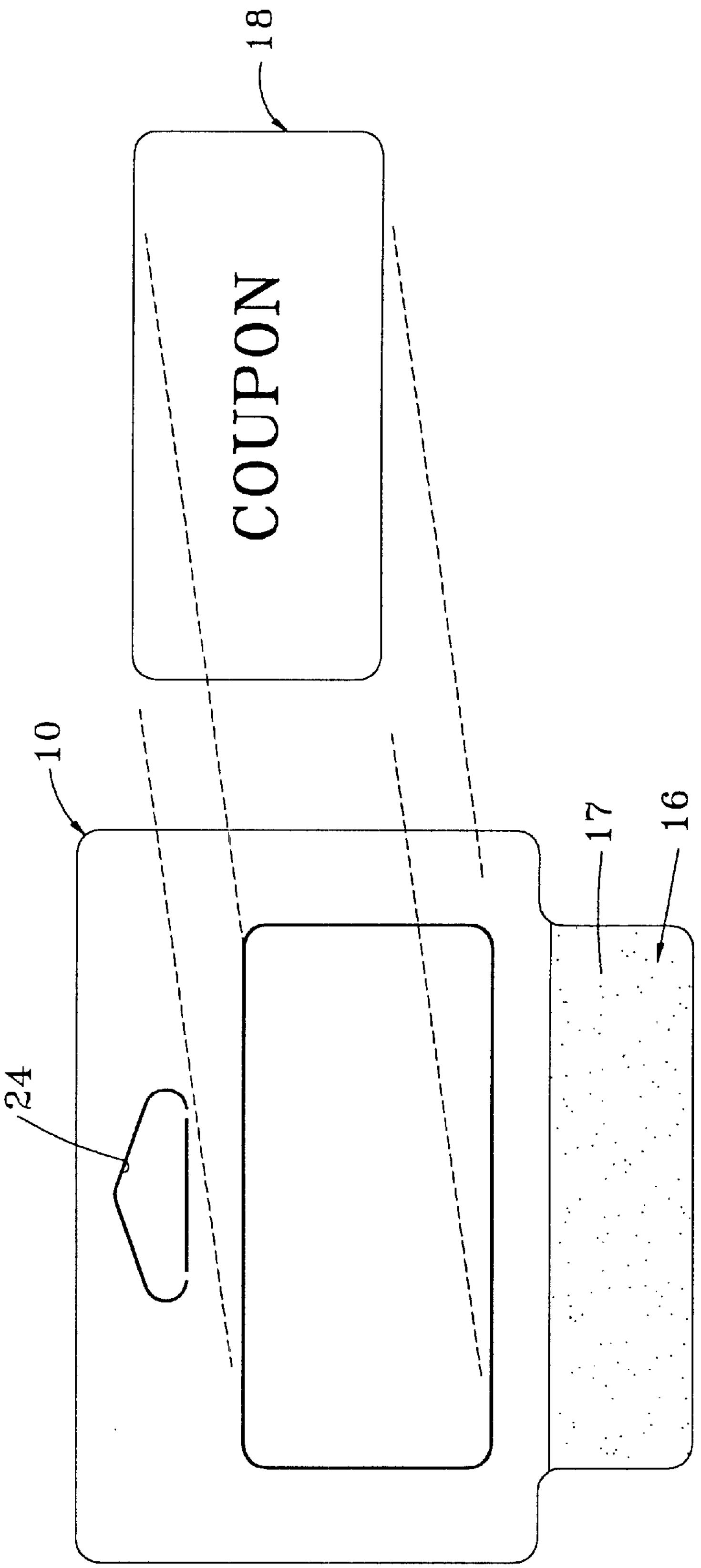
FIG. 3 is a plan view of a hang tab embodying the invention and showing the coupon portion removed therefrom.

FIG. 3 illustrates the hang tab 10 with the coupon section 18 separated from the flat sheet 13. Removal of the coupon section 18 from connection to the flat sheet 13 is accomplished by applying a sufficient force directed perpendicular to a plane of the coupon to cause a severing of the small width webs 29 of the perforated joint 19. After removing the coupon section 18, one may use the coupon in a subsequent purchase.

Figure 4:
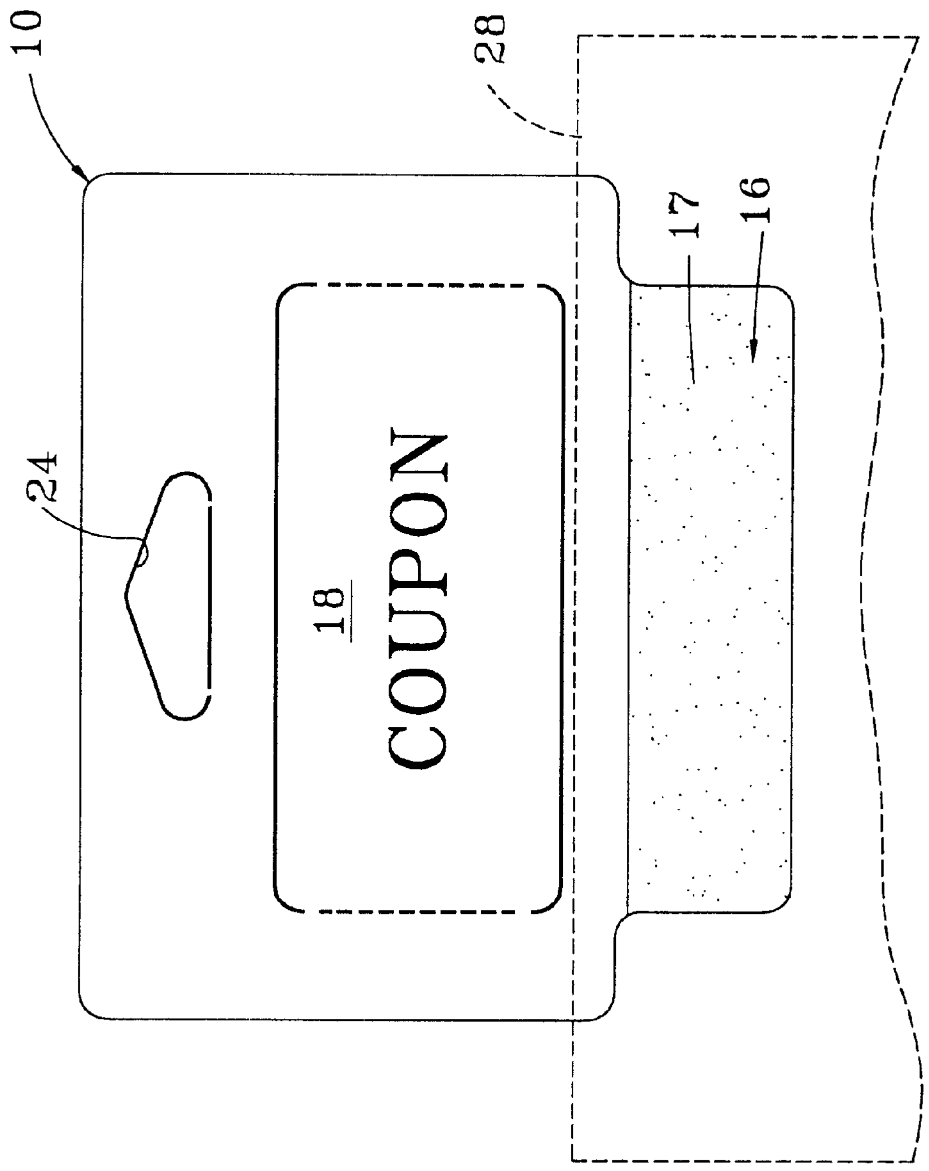
FIG. 4 is an isometric view of the hang tab embodying the invention placed on an article thereby making it ready for display.

FIG. 4 shows the use of a hang tab 10 with an article 28 for sale. The bonding section 16 with the adhesive layer 17 thereon adheres to the article 28. The article 28 is thereafter suspended by inserting a peg or other form of support, not shown, in the hole 24. The coupon section 18 may be removed after purchase of the article 28.

Figure 5:
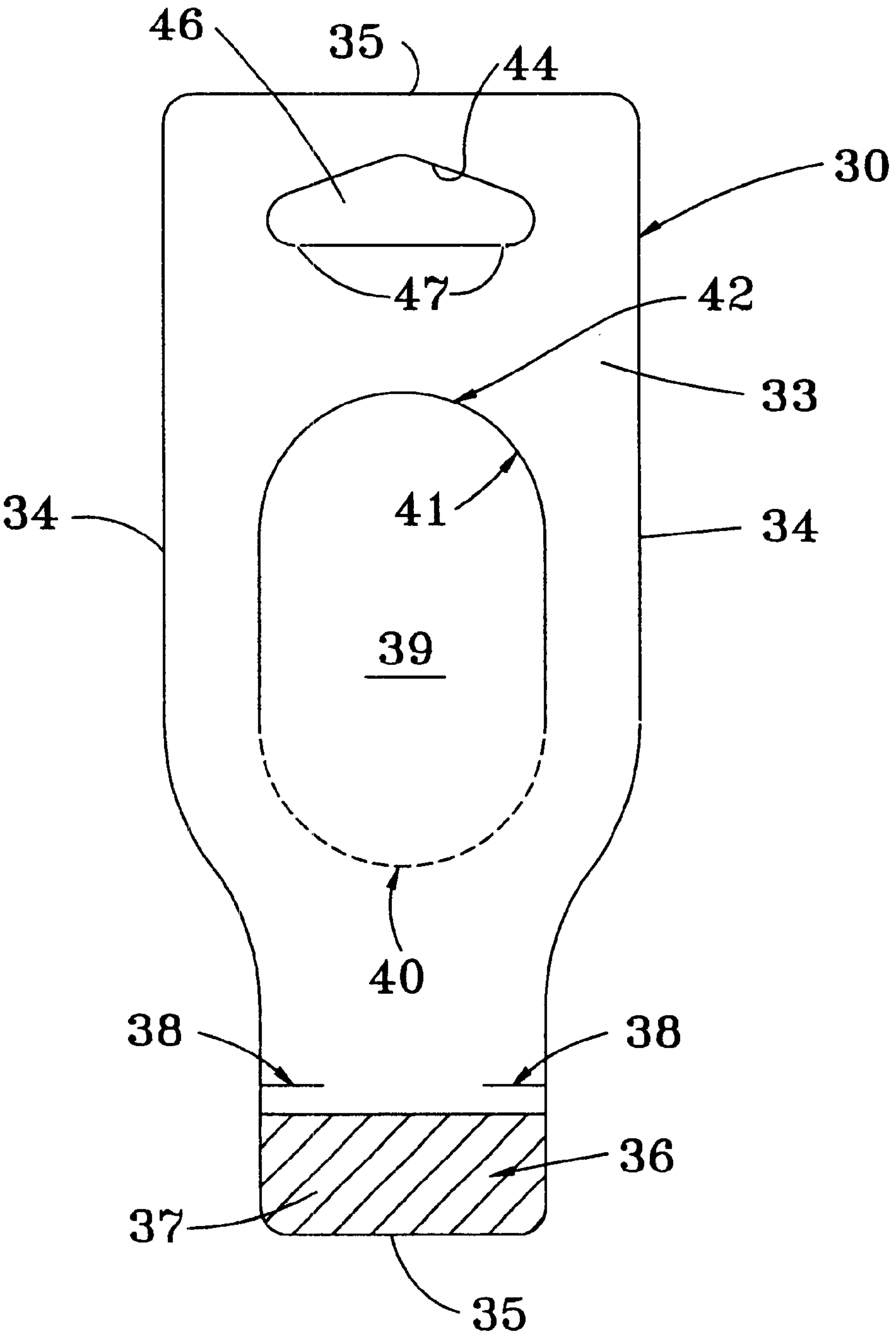
FIG. 5 is a plan view of a differently shaped hang tab embodying the invention.

FIG. 5 shows a differently shaped hang tab 30. The hang tab 30 is also made of a uniformly thin flat sheet 33 of synthetic resin material. The flat sheet 33 is of an elongate, generally rectangular, configuration having parallel long side edges 34 and parallel short side edges 35. A bonding section 36 is, like is also present in the previous embodiment, of a narrower width configuration, so that the spacing between the parallel edges 35 thereof is less than the spacing between long side edges 34, and has an adhesive layer 37 conventional to this art applied thereto. In this particular embodiment, the bonding section 36 is offset from a short edge 35 of the rectangle unlike the bonding section 16 in FIG. 2 which is offset from a long edge 14. A pair of relief cuts 38 are provided into the long edges 34 adjacent the adhesive layer 37.

A coupon section 39 is formed within the peripheral boundary of the flat sheet 33 as an integral part of the hang tab 30. A perforated joint 40 and a precut portion 41 facilitate easy removal of the coupon section 39 from the flat sheet 33. In this embodiment, the perforated joint 40 is tearable and is provided across only one of the short side edges 42 of the coupon section 39, while the remainder of the perimeter of the coupon section 39 is precut as at 41.

A hole 44 is located adjacent to the coupon section 39, preferably between the coupon section 39 and a short side edge 35 remote from the bonding section 36. A small hole filler piece 46 is oriented in the hole 44 and is integrally secured to the flat sheet 33 at least at one point on the perimeter of the hole 44 by a tearable small width web 47.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A hanger, comprising:

a uniformly thin flat sheet of synthetic resin material having thereon a bonding section capable of receiving an adhesive layer;

a coupon section integrally formed with said flat sheet and oriented offset from said bonding section, said coupon section and said flat sheet being joined by a perforated joint extending over a first portion of a perimeter of said coupon portion, the remaining second portion of the perimeter being free of connection to said flat sheet; and said flat sheet having a hole formed therethrough in a region separate from and adjacent said coupon section.

2. A hanger in accordance with claim 1, wherein said hole is initially filled by a piece integrally formed and connected to said flat sheet by a small width web in at least one location at the perimeter thereof.

3. A hanger in accordance with claim 1, wherein said flat sheet is rectangular in shape and has two parallel long sides and two short sides, and said first portion of said perimeter of said coupon section being parallel with said long sides and said second portion of said perimeter of said coupon section being parallel to said short sides.

4. A hanger in accordance with claim 1, wherein said flat sheet is rectangular in shape and has two parallel long sides and two short sides, and said first portion of said perimeter of said coupon section being parallel with said short sides and said second portion of said perimeter of said coupon section being parallel to said long sides.

5. A hanger, comprising:

a rectangular, uniformly thin flat sheet of synthetic resin material having a first set of two short edges and a first set of two long edges, one of said long edges having a bonding section adjacent thereto, said bonding section having adhesive applied thereto;

a rectangular coupon section integrally formed with said flat sheet and oriented offset from said bonding section, said coupon section having a second set of short edges parallel to said first set of short edges and joined to said flat sheet thereat by a perforated joint, said coupon section having a second set of long edges parallel to said first set of long edges, said second set of long edges being free of connection to said flat sheet; and said flat sheet having a hole formed therethrough in a region between one of said first set of long edges on said flat sheet and one of said second set of long edges on said coupon section.

6. A hanger in accordance with claim 5, wherein said hole is initially filled by a piece integrally formed and connected to said flat sheet by a small width web in at least one location at the perimeter thereof.

7. A hanger in accordance with claim 5, wherein said hole is oriented on a side of said coupon section remote from said bonding section.

8. A hanger, comprising:

a rectangular, uniformly thin flat sheet of synthetic resin material having a first set of two short edges and a first set of two long edges, one of said short edges having a bonding section adjacent thereto, said bonding section having adhesive applied thereto;

a rectangular coupon section integrally formed with said flat sheet and oriented offset from said bonding section, said coupon section having a second set of short edges parallel to said first set of short edges and joined to said flat sheet at only one of said short edges by a perforated joint, said coupon section having a second set of long edges parallel to said first set of long edges, said second set of long edges and a remaining short edge being free of connection to said flat sheet; and said flat sheet having a hole formed therethrough in a region between one of said first set of short edges on said flat sheet and one of said second set of short edges on said coupon section.

9. A hanger in accordance with claim 8, wherein said hole is initially filled by a piece integrally formed and connected to said flat sheet by a small width web in at least one location at the perimeter thereof.

10. A hanger in accordance with claim 8, wherein said hole is oriented on a side of said coupon section remote from said bonding section.

11. A hanger for suspending a product, the product having a first top edge and a side, comprising:

a uniformly thin flat sheet of synthetic resin material having thereon a bonding section capable of receiving an adhesive layer, said flat sheet having a second top edge;

a coupon section integrally formed with said flat sheet and oriented offset from said bonding section, said coupon section and said flat sheet being joined by a perforated joint extending over a first portion of a perimeter of said coupon portion, the remaining second portion of the perimeter being free of connection to said flat sheet; and said flat sheet having a hole formed therethrough in a region separate from and adjacent said coupon section; and said bonding section with adhesive thereon being bondable to the side of the product with said hole being oriented adjacent the first top edge of the product and said coupon section oriented between said bonding section and said hole, said coupon section being accessible for removal from said flat sheet by severing of said perforated joint.

12. A hanger in accordance with claim 11, wherein said hole is initially filled by a piece integrally formed and connected to said flat sheet by a small width web in at least one location at the perimeter thereof.

13. A hanger in accordance with claim 11, wherein said flat sheet is rectangular in shape and has two parallel long sides and two short sides, and said first portion of said perimeter of said coupon section being parallel with said long sides and said second portion of said perimeter of said coupon section being parallel to said short sides.

14. A hanger in accordance with claim 11, wherein said flat sheet is rectangular in shape and has two parallel long sides and two short sides, and said first portion of said perimeter of said coupon section being parallel with said short sides and said second portion of said perimeter of said coupon section being parallel to said long sides.

* * * * *